Figure 1:
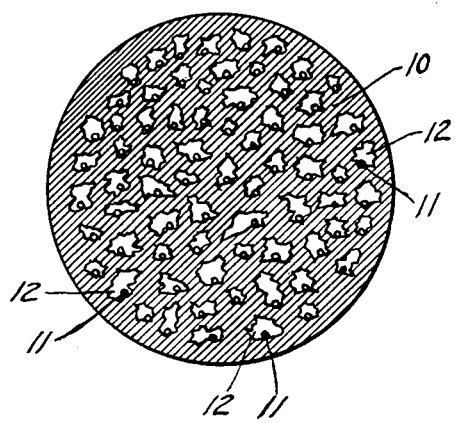

April 3, 1962 C. I. JUSTHEIM ET AL 3,028,330
NUCLEAR FUEL ELEMENTS HAVING AN AUTOGENOUS
MATRIX AND METHOD OF MAKING THE SAME
Filed April 7, 1959 2 Sheets-Sheet 1

Clarence I. Justheim
Morgan G. Huntington INVENTORS

BY
Sughrue, Rothwell, Mion and Zinn Attorneys

April 3, 1962 C. I. JUSTHEIM ET AL 3,028,330
NUCLEAR FUEL ELEMENTS HAVING AN AUTOGENOUS
MATRIX AND METHOD OF MAKING THE SAME
Filed April 7, 1959
2 Sheets-Sheet 2

Clarence I. Justheim
Morgan G. Huntington  Inventors

By Sughrue, Rothwell, Mion and Zinn

Attorneys

3,028,330
NUCLEAR FUEL ELEMENTS HAVING AN AUTOGENOUS MATRIX AND METHOD OF MAKING THE SAME
Clarence I. Justheim, Salt Lake City, Utah, and Morgan G. Huntington, Washington, D.C., assignors to RNB Corporation, Salt Lake City, Utah
Filed Apr. 7, 1959, Ser. No. 804,713
11 Claims. (Cl. 204—193.2)

This invention relates to an autogenously contained solid nuclear fuel matrix and method for making the same. More particularly, this invention relates to a solid nuclear fuel comprised of discrete particles and fragments of fissionable material disposed in a cellular matrix having a plurality of voids therein which is adapted for operation through temperature ranges beyond the vaporization temperature of plutonium carbide and the method of forming this fuel within the containing material. This fuel matrix provides containment of the fissionable and fertile isotope fragments through phase changes from solid to liquid and from liquid to solid without rupture of the cell wells and, at the same time, gaseous products may diffuse and escape without destruction of the cellular matrix.

Nuclear fuels are customarily clad in metals, ceramics, cermets, carbides or graphite, or in some combination or similar material. No presently known system of nuclear fuel containment is adequate for operation at temperatures of high incandescence, i.e., above 3000° F.

So far, the practice of cladding fissionable materials within metals and non-metals has been found unsatisfactory, inadequate, difficult, costly and accompanied by certain hazards and disadvantages as enumerated below:

In the case of metal cladding, the fuel element must operate well below the metallurgical limit of the cladding. Even a modest power excursion would result in fuel element melt-down and destruction of the critical array.

Although cermet and non-metallic claddings would appear to promise freedom from the metallurgical temperature limit, such claddings usually fail by rupture resulting from fuel volume increases due to phase change and/or fuel radiation damage.

Fuel element cladding failure is commonly caused by the high thermal stress set up by temperature differentials within the element when operated at substantial power levels.

Since all previously known fuel elements which operate above 300° F. are cooled by a fluid coolant circulating through or around the critical assembly, fuel element failure results in the entrainment of fission products as well as in the corrosion and/or erosion and entrainment of the fuel itself.

Fuel elements now in use are costly to fabricate and require close temperature control during reactor operation to prevent failure of the cladding material and/or complete destruction of the fuel array itself.

We intend to overcome the above-recited deficiencies and hazards of prior practices and to provide a method and apparatus which will perform the function of cladding fissionable and fertile nuclear fuels without their being subject to the inherent disadvantages of the metallurgical and ceramic temperature limits. Our invention basically consists of a method for cladding isotopes of uranium and other fissile and fertile materials in a matrix consisting largely of carbon or coke for highest temperature operation. Cermets, ceramics, carbides or other like materials may be used in place of carbon for moderate temperature ranges. The fuel is in solid particle form and is disposed within the cells of the matrix.

Our nuclear fuel autogenous cladding or containing matrix has the following desirable properties:

The material has a very small nuetron absorption cross section.

It is passive to corrosive attack by molten and gaseous fertile and fissile materials and to their fission products.

It has a high thermal transfer rate, and being of low density, it is partially transparent to thermal radiation.

It is insensitive to thermal shock.

The multitudinous individual cells of the autogenously formed matrix provide sufficient space around each separate fragment of fertile and fissionable isotope as to allow room for volume increases due to phase change and/or radiation damage.

It will contain molten fissionable and fertile isotopes without serious mass transfer and yet allow gaseous products to diffuse through the cell walls without damage thereto.

The fuel cladding matrix presents no difficulty in the chemical or pyrometallurgical reprocessing cycle.

The cladding material itself will suffer no damage from particle or photon bombardment at the temperature of incandescence.

The cladding matrix material has a low mass number and contributes substantially to the moderating of fast neutrons.

By our method, cladding is performed in such a manner that each fuel fragment is contained in an individual bubble or cell within the matrix. The individual cell may be relatively large in proportion to the fuel globule or fragment which it contains. Thus, the space surrounding the fuel fragments is sufficient to allow for any increase in volume resulting from phase change or radiation damage in the fuel, and the cell walls are so formed as to adequately contain molten nuclear fuel and molten fission products, but at the same time to permit the separation by diffusion of gaseous or vaporized products.

Although the fuel matrix may be placed in containers before or after the autogenous fuel cladding process, it is emphasized that the matrix so formed is itself sufficient to contain fuel and fission products while operating as part of a critical assembly.

A preferred method of producing our nuclear fuel matrix is to mix the fuel fragments or pieces with some natural or artificially thermally setting material which will melt and at the same time evolve gas within the particular temperature range. At the close of the gasing period, the material becomes rigid, and with rising temperature, a strong wall cell or bubble forms around the fuel fragment.

It is essential that heating be begun within the fuel fragment and that the thermal wave proceed outward through the autogenous cladding mixture. Evolution of gas must commence immediately against each fuel fragment or particle while the mixture is plastic or molten. Thermal setting must follow closely the intumescent and gasing stage.

One suitable, naturally occurring material which meets the above requirements for an autogenous fuel cladding material is bituminous coking coal. This material passes through a plastic range generally between 700° and 900° F. with the evolution of varying amounts of gas. Another material is petroleum distillation residue with coking properties which passes through a similar plastic and gasing stage followed by thermal setting. Artificial mixtures may be made by using thermally setting materials mixed with gas-evolving compounds in the desired proportion. Of course, any undesirable impurities in the matrix material must be removed.

In order to autogenously form a nuclear fuel cladding matrix by our power method, the fuel particles must be preferentially heated within the mixture. This may be accomplished by employing any suitable type of apparatus such as an induction furnace.

The induction heating principle is commonly used to melt ores and metals. The induction-type furnace uses the material to be heated as a secondary of the transformer. The primary winding is connected to the current supply.

In heterogenous mixtures, such as nuclear fuels and coking bituminous matter, current frequencies may be adjusted so that the fuel particles are preferentially heated within the matrix-forming mixture. Thus, the coking process begins at each metallic particle or fragment and results in producing a single cell or bubble about each fragment to be clad. Upon passing through the plastic range, the bituminous matter becomes rigid and effectively provides a containment cell about each fuel fragment.

In case the fuel used with an autogenous cladding mixture is non-conducting, a similar but higher frequency field is employed in heating the core. This system is a dielectric furnace. Like the induction heating, however, preferential heating of the fuel fragments or pieces is accomplished.

The frequency and voltage of the power supply as well as the characteristics of the fuel fragments may be varied so as to preferentially heat the fuel particles and fragments and generate a gas bubble about the fuel and subsequently cause thermal setting of the bubble walls. Thus, autogenous containment is effected of each individual particle or piece of nuclear fuel.

Alternatively, the fuel particles and thermally setting matrix material mixture may be packed within a container of graphite, silicon carbide or some other material and, with suitable cooling and venting provision, can be placed in an in-pile loop within a critical array or reactor. Thus, the fissionable and fertile isotope fragments may be preferentially heated in such a manner. Coking or other thermal setting processes may proceed from the heated particle or piece and result in individual cladding of each fuel fragment while part of an in-pile loop.

Although this invention is aimed at taking advantage of radiantly transferring heat from the critical array to boiler tubes or other energy receiver, it is recognized that some other reactor applications require than a coolant be passed over the fuel matrix, and that in some cases, it would indeed be advantageous to transfer heat by conduction and convection. This fuel cladding method provides fuel elements which are also applicable to use in gas and liquid cooled reactors.

Among the objects and advantages to be obtained by this invention are as follows:

To provide a cladding and containment matrix for fissionable and fertile nuclear fuels which can be safely and satisfactorily used through temperatures of high incandescence.

To provide a nuclear fuel cladding matrix which does not suffer from the usual metallurgical temperature limitation.

To provide a nuclear fuel cladding matrix which will not rupture as a result of phase change of the contained fissile and fertile isotopes and their fission products.

To provide a nuclear fuel cladding matrix which will not rupture because of radiation damage to the matrix itself.

To provide a nuclear fuel containing matrix which will hold fissionable and fertile isotopes of nuclear fuels and their fission products, while molten, and at the same time allow the gaseous products to diffuse and leave the containing matrix without damage thereto.

To provide a fuel cladding matrix which is relatively insensitive to thermal shock and thermal stress.

To provide a nuclear fuel cladding matrix which is relatively transparent to thermal radiation and which may safely function so that temperature differentials as great as 3000° F. may exist between the center of the element and its surface.

To provide a fuel cladding matrix which may be formed into a variety of shapes and/or be furnished as a filling for different types of containers.

To provide a method and apparatus for the preferential heating of fissionable and fertile isotope fragments or pieces so that a cell or bubble of controlled size will grow about the metallic fragment or metallic compound and thus form a fuel-cladding matrix of desired properties.

To provide a method and apparatus for causing the preferential heating of the fissionable and fertile fragments in a coking or thermally setting matrix wherein the gas evolved during the process of coking is first generated at the preferentially heated fissionable or fertile fragment.

To provide a method and apparatus wherein and whereby a mixture of gas-evolving and thermally setting materials may be caused to form bubbles or cells about the preferentially heated nuclear fuel fragments.

To provide a method whereby, through the preferential heating of the fissionable and fertile fragments within the mixture of gas-evolving and thermally setting material, the gas will be driven off first at the preferentially heated fuel fragment forming the nucleus of the bubble and that gas evolution will be nearly completed before the final thermal setting of the cladding material itself. This results in the formation of a separate cell about each individual fragment of fissile and fertile material.

Other objects of the invention will be pointed out in the following description and claims and illustrated in the accompanying drawings, which disclose, by way of examples, the principle of the invention and the best mode which has been contemplated of applying that principle.

Figure 2:
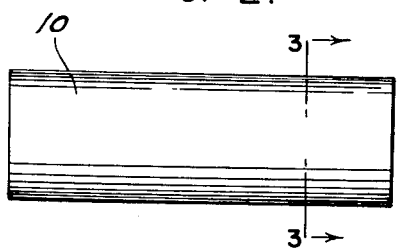
Figure 3:
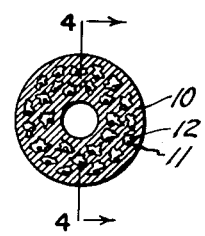
Figure 4:
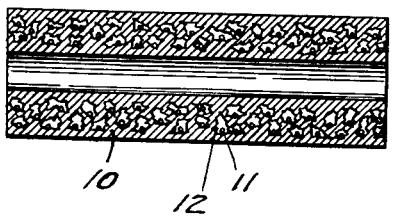
Figure 5:
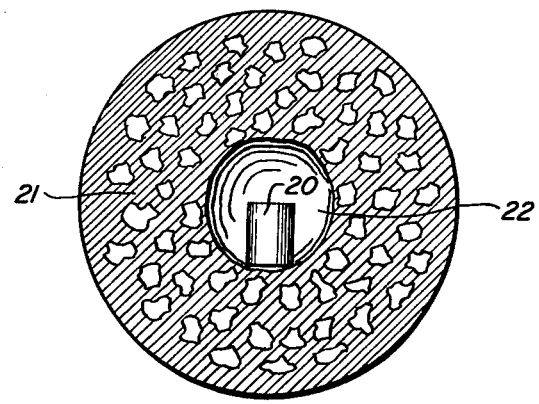
Figure 6:
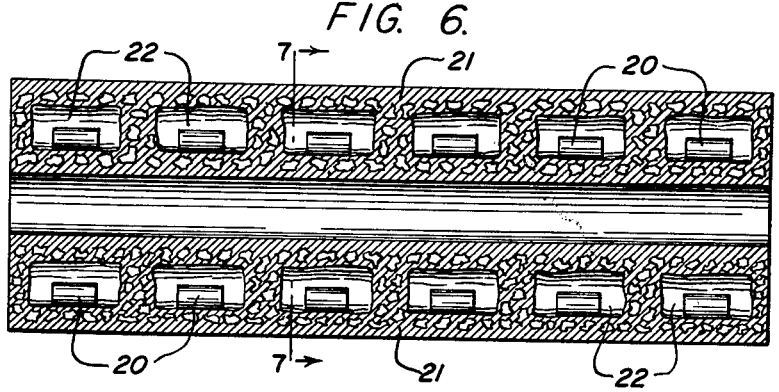
Figure 7:
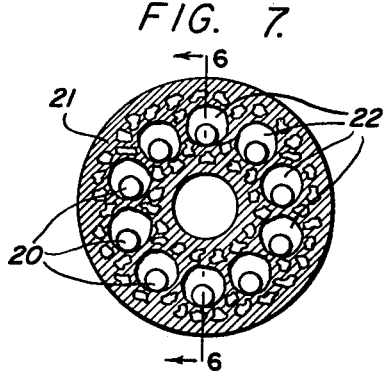

In the drawings:

FIG. 1 represents a section taken diametrically through a nuclear fuel element molded to spherical configuration during production of the one embodiment of nuclear fuel conforming to the invention, the cells and fragments of fissile nuclear material being enlarged for convenience of illustration;

FIG. 2, a side elevation of a nuclear fuel element made up of the same nuclear fuel but molded to tubular formation;

FIG. 3, a transverse section taken on the line 3—3 of FIG. 2;

FIG. 4, a longitudinal section taken on the line 4—4 of FIG. 3;

FIG. 5, a view corresponding to that of FIG. 1, but showing another embodiment of the nuclear fuel, wherein the fissile nuclear material is contained in a relatively large pellet;

FIG. 6, a view corresponding to that of FIG. 4, but drawn to an enlarged scale and containing the pelletized nuclear material of FIG. 5;

FIG. 7, a view corresponding to FIG. 3 but taken with respect to the fuel element of FIG. 6.

Referring to the drawings:

The fuel element of FIG. 1 is of the type contemplated for special application. As such, it is conveniently of spherical form and of size determined by the particular circumstances of use, say from 1 to 6 inches in diameter.

The only difference between the fuel element and the nuclear fuel itself is the configuration selected for the element to adapt it to a particular use. No container for the fuel is necessary, as with conventional nuclear fuels, since the nature of this new fuel is such that cladding is autogenous. Conventional cladding may be employed, however, if advantageous for certain uses, in instances where the operating temperature of the fuel element is low enough to permit.

As indicated previously, one embodiment of the nuclear fuel of this invention is characterized by a cellular matrix containing within respective cells thereof fragments of a fissile material, which may be fertile isotopes of uranium enriched with fissionable isotopes. In FIGS. 1–4, such a cellular matrix 10 of a suitable material contains fragments 11 of a fissionable material within the cells 12 thereof.

The matrix is continuous and of cell-sealing character throughout the fuel, providing a fuel element having adequate structural strength for all practical purposes. It may be provided by various materials, depending upon the desired operating temperature. For highest temperatures and incandescence, graphitized coke is ideal and is believed to represent a decidedly novel and useful contribution to the art apart from the broader aspects of this disclosure. Other thermal-setting materials, such as cermets, ceramics, and carbides, may be utilized for moderate temperature ranges, if processed for cell formation in accordance with the process.

The cells 12 are ordinarily of such size relative to the fissionable fragments 11 as to fully allow for increase in volume of the latter resulting from thermal cycling and radiation damage. If not, however, the cellular nature of the matrix will permit expansion without more than localized shattering of the matrix internally thereof.

In practice, the cell size will depend to a certain extent on the nature of the material utilized for the matrix 10. For example, where the matrix is graphited coke, the characteristic cell size for a given variety of coke will prevail.

In the embodiment of nuclear fuel of the invention illustrated in FIGS. 5–7, the fissile material is in the form of pellets of uranium or plutonium oxide or carbide. These pellets are disposed in orderly fashion within accommodating voids formed within the matrix, the number of same being dependent upon the particular form of fuel element concerned.

In FIG. 5, the fuel element is in the form of a ball, which may, for example, have a diameter of approximately one inch. A single pellet 20 is embedded within the ball-forming matrix 21, being disposed within an accommodating void 22 within such matrix. Such pellet is conveniently of cylindrical configuration and may, for example, have a diameter of from 3/16" to 3/8" and a length of from 3/8" to 1/2".

In producing such fuel element, the matrix-forming material—advantageously coking bituminous material, as in the previous embodiment—is molded about the pre-formed pellet 20, and the resulting article is subjected to preferential heating, as aforedescribed. The void 22 is formed by gas evolved from the intumescent, coking, matrix material in the immediate vicinity of the preferentially heated pellet of fissionable material, as will be explained in detail hereinafter.

The tubular fuel element of FIGS. 6 and 7 corresponds to that of FIG. 4, utilizing the pellets 20, however, instead of fragments of fissile material. The tube-forming, matrix material 21 is molded to shape, with cylindrical passages being formed at intervals about and longitudinally through the annular walls thereof. The pellets 20 are placed in end to end mutually spaced alignment within such passages prior to the preferential heating aforedescribed, matrix-forming material being introduced therebetween so that the pellets are arranged in annular layers in the final fuel element, as shown.

The preferential heating produces voids 22 about the individual pellets, yielding a nuclear fuel element having the essential features and satisfying the enumerated objectives of the invention.

An advantageous size for the fuel element of FIGS. 6 and 7 is 2" outside diameter, 1/2" inside diameter (3/4" wall thickness), and 6" length. The number of fissile fuel pellets embedded in the tubular matrix will depend upon the circumstances of use. By way of example, from six to eight pellets may be conveniently employed for each of, say, five or six layers.

Production of the nuclear fuel in accordance with the method or process of this invention is preferably accomplished by the well-known technique of preferential heating, utilizing any of the forms of apparatus known for the purpose.

In the instance of coke, a bituminous coking coal or a petroleum distillation residue provides the raw material for the matrix. It is crushed and sized to come within the range of preferably 4 to 100 mesh and is then thoroughly intermixed with the fissionable material as fragmented to appropriate size for the cells formed in the carbonaceous matrix during the coking procedure. An appropriate size for the fragments of nuclear material can be readily determined from existing knowledge with respect to radiation and thermal cycling effects on fissile materials, i.e., see pp. 223–227 "Nuclear Fuels" Gurinsky and Dienes, D. Van Nostrand Company, Inc., 1956.

According to one method of making the fuel element, a crucible is packed with the mixture. A winding outside the crucible is the source of energy for the induction heating. The fuel matrix may be packed into the crucible, or the crucible may be loaded with smaller receptacles into which the fuel matrix is packed. The crucible is placed inside of a tubular muffle of the induction furnace, and a plug or door closes the tubular muffle. As electric power is applied to the furnace through the outside water-cooled windings, the building and collapsing of electric fields causes the preferential heating of the metallic compound fragments of the fissionable and fertile isotopes mixed with the autogenous cladding materials.

As heating of the metal fragments proceeds, evolution of gas from the coking materials causes bubbles to form about the nuclear fuel fragments. Since the gas evolution is largely confined to the period of intumescence which in the case of coking coals lies between 700° and 900° F., most or all of the gas is evolved before the intumescent range is past. At that stage, the bubble becomes rigid, and a suitable containing cell is individually effected about each fuel fragment.

Power is continuously applied to the induction furnace until the entire mass has passed through the intumescent temperature range and has become solid, and until all gas is evolved. The finishing temperature recommended is above 3000° F.

The crucible is removed from the graphite muffle and the matrix is allowed to cool. Upon cooling, the matrix is emptied from the crucible and may be broken into convenient lumps or formed into convenient shapes. When desired, unclad fuel fragments or exposed particles may be removed from the fuel matrix by leaching in a suitable acid.

The size of the individual cells surrounding the nuclear fuel pieces may be controlled by adjusting the amount of gas evolving matter which is mixed with the thermally setting material or by mixing high and low volatile coals or other suitable means. The size of the individual cells may also be controlled by the rate at which power is applied to the induction furnace by the frequency or by alloying or compounding the fertile and fissionable isotopes and thus adjusting the preferential heating effects of hysteresis.

In a modified method of making the fuel elements by preferential heating, the autogenous fuel cladding mixture is packed between two concentric tubes which are closed on one end, and the entire assembly may be placed within a critical array as part of an in-pile loop of an operating reactor. In this particular case, the isotope fragments are preferentially heated by irradiation and by nuclear fission, and like the preferred form above, heating of the autogenous cladding matrix proceeds outward from the isotope particles. This in-pile loop element may be placed within a silicon carbide or graphite tube in the critical array of an operating reactor, and carbon monoxide gas or some other suitable medium may be passed downward through the center and up through the outside in order to effect cooling and to remove the gaseous products resulting from the autogenous cladding process.

Whether an induction or dielectric type of furnace is used or whether the raw fuel cladding matrix mixture is packed within the receptacle and placed within the critical array within an operating reactor, the effect is essentially the same. In all cases, heating proceeds outward from the fuel fragment, causing the evolution of gas immediately at the fissionable fragment or piece of nuclear fuel, and, as the intumescent temperature is passed, the walls of the individual bubbles become rigid, and cladding is effected.

It is pointed out and emphasized that there is a similarity of function and principle between the forms described above. The similarity consists in the formation of fuel cladding matrix which is comprised of a great many individual bubbles or cells which surround fragments or pieces of fertile and fissionable material. All of these forms embody a method and principle of autogenously cladding fissionable and fertile isotopes of nuclear fuels.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

This application is a continuation-in-part of application Serial No. 740,709, filed June 6, 1958, and now abandoned, which is in turn a continuation-in-part of application Serial No. 717,749, filed February 26, 1958, and now abandoned.

What is claimed is:

1. A nuclear fuel element consisting essentially of fertile and fissionable fuel fragments enclosed within cells in a matrix of graphitized coke, each of said cells having walls completely enclosing said fuel fragments and each of said cells having a volume greater than the volume of the fuel fragment, said volume being sufficient to provide a void space between said walls and said enclosed fragments.

2. A nuclear fuel element consisting essentially of a matrix having a plurality of cells therein and fragments of fissionable material disposed within said cells, each of said cells having walls completely enclosing said fragments of said fissionable material, the volume of each of said cells being greater than the volume of said fragments of fissionable material contained therein, the volume of each of said cells providing a void space between said walls and said fragments of fissionable material.

3. A nuclear fuel element consisting essentially of a graphitized coke cellular matrix, and particles of fissionable material enclosed within individual cells of said matrix, said individual cells having walls completely enclosing each of said particles of fissionable material, each of said individual cells having a volume greater than the volume of said particles enclosed therein providing a void space between said walls of each individual cell and said enclosed particles to allow for expansion of said particles without damaging the matrix.

4. A nuclear fuel element consisting essentially of a matrix of a coking material having a plurality of internal voids therein, and a plurality of fissile particles enclosed within said internal voids, the volume of said voids being sufficiently larger than the volume of said particles to provide space for expansion of said fissile particles without damage to said matrix.

5. A method for producing a nuclear fuel element comprising the steps of mixing a coking bituminous substance which will evolve the gas under a rise in temperature preceding setting of the substance with particles of a fissionable material, first heating the fissionable particles to initiate the evolution of gas immediately adjacent to said particles of fissionable material, continuing the heating of said fissionable particles to evolve sufficient gas to form a cell completely surrounding said particles and then heating said coking bituminous substance to cause complete thermal setting of said coking bituminous substance including the walls of said cells completely surrounding said fissionable particles.

6. A method of producing a nuclear fuel element comprising mixing a bituminous coking substance with particles of fissile material, first heating the particles of fissile material in the mixture to evolve gas around each of said particles, continuing the heating of said fissile material to evolve sufficient gas to create a cell completely surrounding each of said particles and continuing the heating of said mixture to cause complete thermal setting of said bituminous coking substance including the walls of the cells surrounding each of said particles.

7. A nuclear fuel element consisting essentially of small particles of a fertile and fissionable nuclear fuel material disposed in cells in a matrix of coking bituminous material which has impurities removed therefrom, the walls of said cells completely enclosing each of said small particles and said walls being impermeable to said nuclear fuel particles when said particles are in both a solid and a liquid phase.

8. A nuclear fuel element as defined in claim 7 wherein said nuclear fuel material consists essentially of plutonium carbide.

9. A nuclear fuel element as defined in claim 7 wherein said nuclear fuel material consists essentially of uranium carbide.

10. A method of making a nuclear fuel element with an autogenous matrix, said method comprising mixing a purified powdered coking bituminous material with fragments of a nuclear fuel, first heating said fragments in said mixture to a temperature at which the adjacent coking bituminous material becomes plastic and evolves gas around each of said fragments and creates cells in said matrix, each of said cells having walls completely surrounding said fuel fragments, and continuing the heating to thermally set the coking matrix including said walls of the cells surrounding each fuel fragment.

11. A method as defined in claim 10 further comprising removing from said nuclear fuel element fuel fragments which are not completely enclosed within said matrix.

References Cited in the file of this patent

UNITED STATES PATENTS

| 2,526,805 | Carter et al. | Oct. 24, 1950 |
| 2,569,225 | Carter et al. | Sept. 25, 1951 |
| 2,708,656 | Fermi et al. | May 17, 1955 |

FOREIGN PATENTS

| 788,284 | Great Britain | Dec. 23, 1957 |

OTHER REFERENCES

AEC Document NAA-SR-240, Aug. 12, 1953. Available same as TID-10001. Price 35¢.

AEC Document TID-10001, Oct. 13, 1954. Available from Technical Information Service, Industrial Reports Section P.O. Box 1001, Oak Ridge, Tenn. Price 45¢.

Nucleonics, March 1956, pages 34–44.